US012586469B2

(12) United States Patent
Yoneyama

(10) Patent No.: US 12,586,469 B2
(45) Date of Patent: Mar. 24, 2026

(54) VEHICLE TROUBLE HANDLING SYSTEM

(71) Applicant: ADVICS CO., LTD., Kariya (JP)

(72) Inventor: Shuzo Yoneyama, Kariya (JP)

(73) Assignee: ADVICS CO., LTD., Kariya (JP)

( * ) Notice: Subject to any disclaimer, the term of this patent is extended or adjusted under 35 U.S.C. 154(b) by 108 days.

(21) Appl. No.: 18/685,619

(22) PCT Filed: Jul. 29, 2022

(86) PCT No.: PCT/JP2022/029376
§ 371 (c)(1),
(2) Date: Feb. 22, 2024

(87) PCT Pub. No.: WO2023/047803
PCT Pub. Date: Mar. 30, 2023

(65) Prior Publication Data

US 2024/0221505 A1 Jul. 4, 2024

(30) Foreign Application Priority Data

Sep. 24, 2021 (JP) ................................ 2021-155608

(51) Int. Cl.
*G08G 1/16* (2006.01)
*G08G 1/01* (2006.01)

(52) U.S. Cl.
CPC ........... *G08G 1/164* (2013.01); *G08G 1/0125* (2013.01); *G08G 1/0141* (2013.01)

(58) Field of Classification Search
CPC ..... G08G 1/164; G08G 1/0125; G08G 1/0141
See application file for complete search history.

(56) References Cited

U.S. PATENT DOCUMENTS

2020/0257308 A1* 8/2020 Herman ............... G05D 1/0231
2022/0030430 A1* 1/2022 Lund ....................... H04W 8/24
2022/0081005 A1* 3/2022 Brown .................. G08G 1/162
(Continued)

FOREIGN PATENT DOCUMENTS

JP 62-94443 A 4/1987
JP 2002-274305 A 9/2002
(Continued)

OTHER PUBLICATIONS

International Search Report mailed on Sep. 6, 2022 in PCT/JP2022/029376 filed on Jul. 29, 2022, 4 pages (with English Translation).

*Primary Examiner* — Hussein Elchanti
(74) *Attorney, Agent, or Firm* — Oblon, McClelland, Maier & Neustadt, L.L.P.

(57) ABSTRACT

A vehicle trouble handling system 100 includes a trouble detection unit M11 that detects occurrence of trouble relating to travelling of a vehicle 10 in the vehicle 10, a trouble information transmission unit M13 that acquires trouble information relating to the trouble detected by the trouble detection unit M11, a countermeasure generation unit M15 that generates a countermeasure corresponding to the trouble detected by the trouble detection unit M11 on the basis of the trouble information acquired by the trouble information transmission unit M13, and a countermeasure implementation unit M17 that implements processing corresponding to the countermeasure generated by the countermeasure generation unit M15.

5 Claims, 6 Drawing Sheets

(56) References Cited

U.S. PATENT DOCUMENTS

| | | | | |
|---|---|---|---|---|
| 2022/0122456 | A1* | 4/2022 | Beaurepaire | G06Q 50/265 |
| 2023/0111908 | A1* | 4/2023 | Denninger | H04W 4/46 |
| | | | | 701/23 |
| 2023/0241992 | A1* | 8/2023 | Lei | G08G 1/096725 |
| 2023/0249693 | A1* | 8/2023 | Mukundan | G06V 40/193 |
| | | | | 340/425.5 |

FOREIGN PATENT DOCUMENTS

| | | | |
|---|---|---|---|
| JP | 2012-53821 | A | 3/2012 |
| JP | 2021-103378 | A | 7/2021 |

* cited by examiner

VEHICLE TROUBLE HANDLING SYSTEM

TECHNICAL FIELD

The present disclosure relates to a vehicle trouble handling system.

BACKGROUND ART

In PTL 1, a system that transmits occurrence progress of vehicle trouble and a trouble situation from the vehicle to an external organization is disclosed. In PTL 1, a traffic accident is assumed as the vehicle trouble, and a police, a car dealer, or an insurance company is assumed as the external organization. In addition, it is assumed that the organization is trying to deal with the vehicle trouble smoothly and quickly.

CITATION LIST

Patent Literature

PTL 1: JP2002-274305A

BRIEF SUMMARY

Technical Problem

However, various troubles are considered as the vehicle trouble in addition to the traffic accident. An object of the present disclosure is to provide a system capable of appropriately solving various troubles relating to a vehicle.

Solution to Problem

A vehicle trouble handling system for accomplishing the object is a system that includes a first control device that is provided in a vehicle, and a second control device that is disposed outside the vehicle, and handles trouble relating to travelling of the vehicle. In the vehicle trouble handling system, the first control device includes a trouble detection unit that detects occurrence of the trouble in the vehicle, and a trouble information transmission unit that transmits trouble information relating to the trouble detected by the trouble detection unit to the second control device. The second control device includes a countermeasure generation unit that generates a countermeasure corresponding to the trouble information transmitted from the trouble information transmission unit.

According to the configuration, in the first control device, when occurrence of trouble relating to vehicle's travelling in the vehicle is detected, trouble information relating to the trouble is transmitted to the outside of the vehicle. In the second control device, a countermeasure corresponding to the trouble information transmitted from the first control device is generated. When the countermeasure corresponding to the trouble that occurred in the vehicle is generated in this manner, various kinds of trouble occurring in the vehicle can be handled.

DESCRIPTION OF EMBODIMENTS

First Embodiment

Hereinafter, a first embodiment of a system (hereinafter, referred to as "vehicle trouble handling system") handling trouble relating to travelling of a vehicle (hereinafter, referred to as "vehicle traveling trouble") will be described with reference to FIG. 1 to FIG. 3.

Here, the vehicle travelling trouble includes trouble that interferes with travelling of a vehicle 10 or trouble in which travelling of the vehicle 10 becomes impossible. Examples of the trouble that interferes with travelling of the vehicle 10 include fade, deceleration slip, deficiency in the amount of stored electricity in a battery, and unbalance in air pressure between tires. Examples of the trouble in which travelling of a vehicle becomes impossible include getting stuck, overheating, flooding, and tire burst. The unbalance in air pressure between tires may occur when air leakage occurs in some tires among a plurality of tires.

Figure 1:
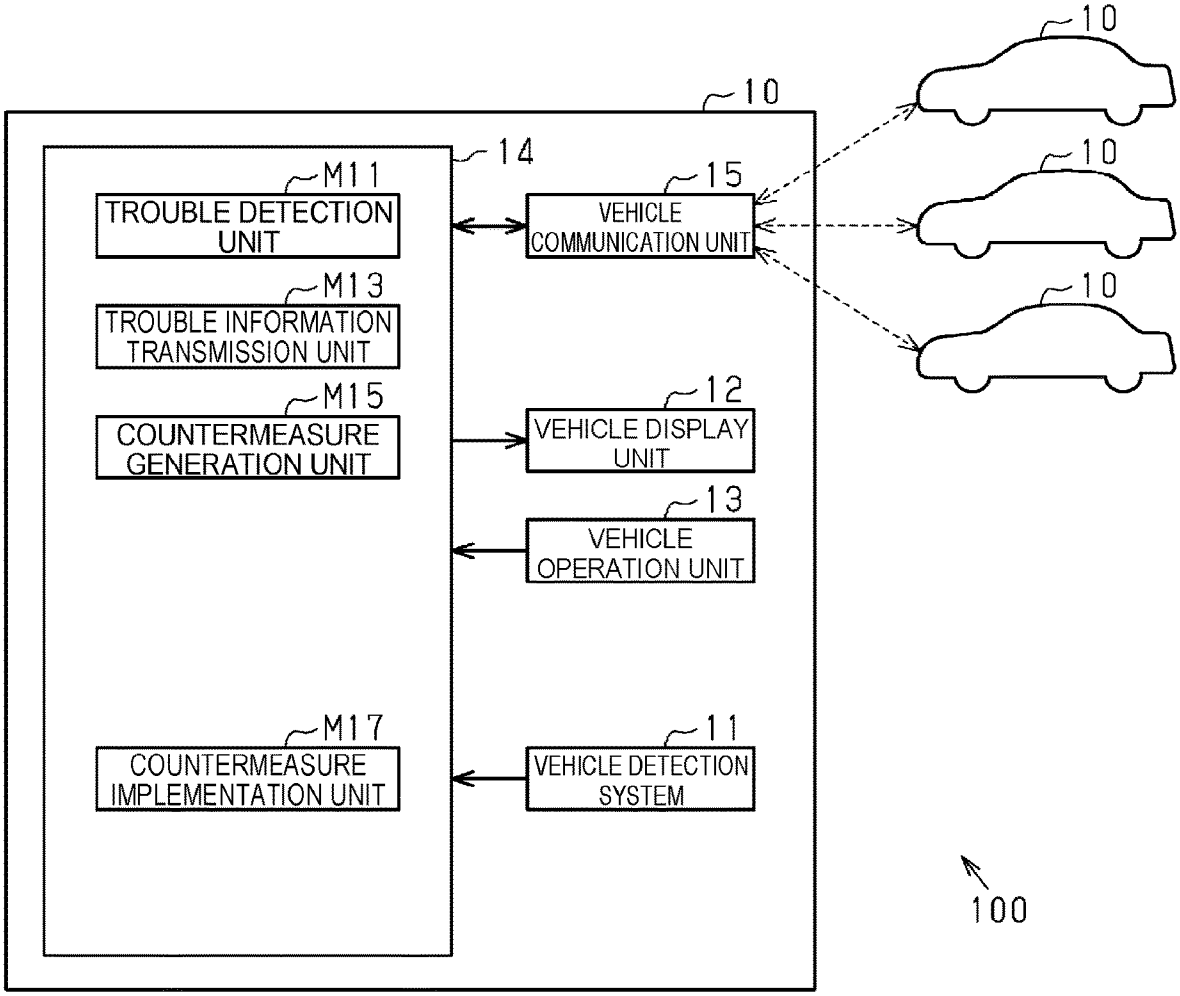
FIG. 1 is a schematic view illustrating a vehicle trouble handling system of a first embodiment.

As illustrated in FIG. 1, a vehicle trouble handling system 100 of this embodiment is configured so that a plurality of vehicles 10 can perform communication by vehicle-to-vehicle communication. Here, the vehicle-to-vehicle communication is radio communication between the vehicles 10.

<Configuration of Vehicle>

Each of the vehicles 10 includes a vehicle detection system 11, a vehicle display unit 12, a vehicle operation unit 13, a vehicle control unit 14, and a vehicle communication unit 15.

The vehicle detection system 11 detects at least one piece between information necessary to determine whether vehicle travelling trouble occurred in the vehicle 10, information indicating a situation when the vehicle travelling trouble occurred. The vehicle detection system 11 includes, for example, a wheel speed sensor, an acceleration sensor, an air pressure sensor, and an imaging device. The air pressure sensor detects air pressure of tires. The imaging device images the outside of the vehicle. In the following description, an output of the vehicle detection system 11 is referred to as "vehicle sensor information".

The vehicle display unit 12 displays information output from the vehicle control unit 14. The vehicle display unit 12 may be a display unit whose main function is to display externally input information (hereinafter, referred to as "external information display function"), or may be a display unit whose subfunction is the external information display function. Here, the display unit whose subfunction is the external information display function is a display unit that has the external information display function in addition to a function of displaying processing results obtained by a device function as in a display unit of a navigation device.

The vehicle operation unit 13 receives an operation by an occupant of the vehicle 10. The vehicle operation unit 13 may include an operation button or a touch panel. In addition, the vehicle operation unit 13 may include a voice recognition device.

The vehicle control unit 14 includes a control unit (hereinafter, referred to as a "CPU") and a memory. A control program is stored in the memory. The vehicle control unit 14 functions as a trouble detection unit M11, a trouble information transmission unit M13, a countermeasure generation unit M15, and a countermeasure implementation unit M17 by periodically implementing the control program by the CPU.

The trouble detection unit M11 detects that the vehicle travelling trouble occurred in the vehicle 10. In this embodiment, it is assumed that the trouble detection unit M11 detects that the vehicle travelling trouble occurred in the vehicle 10 on the basis of vehicle sensor information. In the following description, the vehicle 10 in which the vehicle travelling trouble occurred already is referred to as a "troubled vehicle 10*a*" and the vehicle 10 in which the vehicle travelling trouble does not occur yet is referred to as a "non-troubled vehicle 10*y*".

The trouble information transmission unit M13 generates information (hereinafter, referred to as "trouble information") relating to the vehicle travelling trouble detected by the trouble detection unit M11, and transmits the trouble information from the vehicle communication unit 15 to the outside of the vehicle.

Here, the trouble information includes a type of the vehicle travelling trouble, an occurrence position of the vehicle travelling trouble, an occurrence date of the vehicle travelling trouble, information relating to the troubled vehicle 10*a*, and severity of the vehicle travelling trouble. In addition, the information relating to the troubled vehicle 10*a* includes characteristics of the troubled vehicle, for example, a vehicle type of the troubled vehicle 10*a*, a drive type, equipment, and a power source. As the severity of the vehicle travelling trouble, for example, information indicating whether the vehicle can escape from the vehicle travelling trouble by itself, time required from time at which the vehicle travelling trouble occurred until the vehicle escapes from the trouble, and the magnitude of damage on the troubled vehicle 10*a* due to the vehicle travelling trouble are considered.

The countermeasure generation unit M15 generates a countermeasure (hereinafter, referred to as a "non-troubled vehicle countermeasure") for suppressing the vehicle travelling trouble that occurred in the troubled vehicle 10*a* from occurring in the non-troubled vehicle 10*y* on the basis of the trouble information transmitted from one or a plurality of troubled vehicles 10*a*. The non-troubled vehicle countermeasure is a countermeasure for avoiding occurrence of the vehicle travelling trouble in the non-troubled vehicle 10*y* in advance.

The countermeasure generation unit M15 may generate non-troubled vehicle countermeasure corresponding to the number of the vehicle travelling trouble that occurred in the same area on the basis of the trouble occurrence position as the trouble information, or may generate the non-troubled vehicle countermeasure corresponding to the trouble severity as the trouble information. The countermeasure generation unit M15 may not generate the non-troubled vehicle countermeasure in a case where the number of the vehicle travelling trouble that occurred is less than a predetermined number, or in a case where the trouble severity is lower than a predetermined level.

As the non-troubled vehicle countermeasure, for example, it is considered that the occupant of the non-troubled vehicle 10*y* is notified of the trouble information. In this case, the trouble occurrence position may be shown on a map by a predetermined mark, or the trouble severity may be shown on the map by a size or shape of a predetermined mark.

In addition, as the non-troubled vehicle countermeasure, for example, a proposal for a change of a control mode, a travelling route, or equipment (hereinafter, referred to as a "change of a control mode or the like"), or an instruction for a change of the control mode or the like are considered. The change of the travelling route may be a change to a travelling route in which the number of the vehicle travelling trouble that occurred is relatively small on the basis of the occurrence position of the vehicle travelling trouble as the trouble information, or may be a change to a travelling route that is determined to be less likely to cause the vehicle travelling trouble on the basis of a terrain indicated by map information and the type of the vehicle travelling trouble which is included in the trouble information. The non-troubled vehicle countermeasure may be a proposal to cancel movement with the non-troubled vehicle 10*y*, or may be prohibition of movement with the non-troubled vehicle 10*y*.

Here, an example of the non-troubled vehicle countermeasure in a case where the vehicle travelling trouble is getting stuck will be described. Getting stuck is a phenomenon in which wheels of the vehicle 10 get stuck in snow or mud, and the vehicle 10 cannot move either forward or backward.

Therefore, as the non-troubled vehicle countermeasure relating to getting stuck, a proposal for a change to a control mode of suppressing drive torque acting on the wheels, or a change to a travelling route that is determined to be less likely to cause getting stuck to occur, or an instruction for the changes are considered. As the control mode of suppressing the drive torque acting on the wheels, a control mode of suppressing drive torque to be applied to the wheels, and a control mode of cancelling a part of the drive torque applied to the wheels by braking torque to be applied to the wheels are considered. As the control mode of suppressing the drive torque to be applied to the wheels, for example, a control mode of suppressing a reduction ratio of a transmission is considered. In addition, as the control mode of cancelling a part of the drive torque applied to the wheels by the braking torque to be applied to the wheels, for example, a control mode to which traction control is easy intervene is considered.

Next, an example of the non-troubled vehicle countermeasure in a case where the vehicle travelling trouble is deceleration slip will be described. The deceleration slip is a phenomenon in which wheels slip on a road surface. Therefore, as the non-troubled vehicle countermeasure relating to the deceleration slip, a proposal for a change to a control mode of suppressing braking torque acting on the wheels or a change to a travelling route that is determined to be less likely to cause the deceleration slip to occur, and an instruction for the changes are considered. As the control mode of suppressing the braking torque acting on the wheels, a control mode to which anti-lock braking is easy to intervene is considered.

The non-troubled vehicle countermeasure relating to the deceleration slip may be a proposal for installation of tire chains or replacement with studless tires, guidance of a tire chain installing location or a studless tire replacement location or guidance of a travelling route to the locations, or guidance of purchase locations of the tire chains or the studless tires or guidance of a travelling route to the purchase locations.

The countermeasure implementation unit M17 implements processing corresponding to the non-troubled vehicle countermeasure generated by the countermeasure generation unit M15.

Specifically, in a case where the non-troubled vehicle countermeasure is the proposal for a change of the control mode or the like, the countermeasure implementation unit M17 notifies an occupant of the vehicle 10 of proposal contents, and implements the proposal contents under a condition in which the intention of the occupant for accepting the proposal contents has been received. In this case, the countermeasure implementation unit M17 may display the proposal contents on the vehicle display unit 12 or may convert the proposal contents to a voice. The countermeasure implementation unit M17 may receive an operation on the vehicle operation unit 13 by the occupant of the vehicle 10 as the intention of the occupant.

In addition, in a case where the non-troubled vehicle countermeasure is the instruction of the change of the control mode or the like, the countermeasure implementation unit M17 implements instruction contents without confirming the intention of the occupant of the vehicle 10.

<Flow of Process of Handling Vehicle Travelling Trouble>

Figure 2:
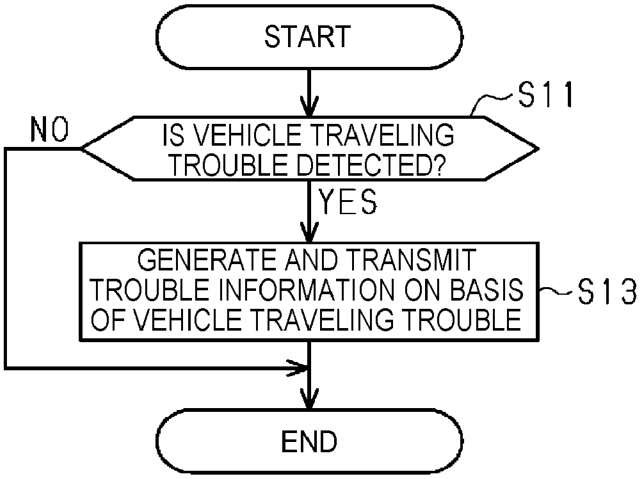
FIG. 2 is a flowchart illustrating a flow of a process of transmitting trouble information.

FIG. 2 is a flowchart illustrating a flow of a process (hereinafter, referred to as a "trouble information transmission process") of detecting the vehicle travelling trouble and transmitting trouble information relating to the vehicle travelling trouble in the vehicle 10. FIG. 3 is a flowchart illustrating a flow of a process (hereinafter, referred to as a "countermeasure implementation process") of receiving the trouble information transmitted from the troubled vehicle 10*a*, generating the non-troubled vehicle countermeasure on the basis of the trouble information, and implementing the non-troubled vehicle countermeasure in the vehicle 10 (non-troubled vehicle 10*y*). A control program corresponding to the processes is stored in the memory of the vehicle control unit 14, and is periodically implemented by the CPU of the vehicle control unit 14.

In step S11, the vehicle control unit 14 determines whether the vehicle travelling trouble has been detected by the trouble detection unit M11. In a case where it is determined that the vehicle travelling trouble is not detected (S11: NO), the vehicle control unit 14 terminates the current process, and in a case where it is determined that vehicle travelling trouble has been detected (S11: YES), the process proceeds to a process in step S13.

In step S13, the vehicle control unit 14 generates trouble information relating to the vehicle travelling trouble detected in step S11 and transmits the trouble information from the vehicle communication unit 15 to the outside of the vehicle by the trouble information transmission unit M13. Then, the vehicle control unit 14 terminates the current process.

Figure 3:
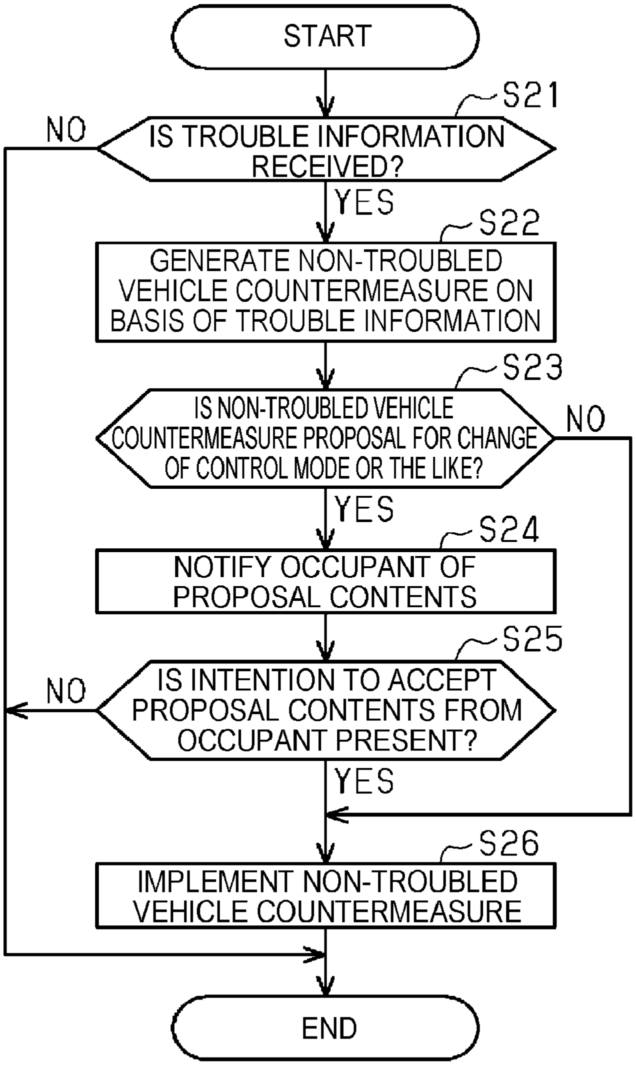
FIG. 3 is a flowchart illustrating a flow of a process of generating a non-troubled vehicle countermeasure and implementing the countermeasure.

In step S21 in FIG. 3, the vehicle control unit 14 of the non-troubled vehicle 10*y* determines whether the trouble information transmitted from the troubled vehicle 10*a* is received by the vehicle communication unit 15. In a case where it is determined that the trouble information is not received (S21: NO), the vehicle control unit 14 terminates the current process, and in a case where it is determined that the trouble information has been received (S21: YES), the process proceeds to a process in step S22.

In step S22, the vehicle control unit 14 generates a non-troubled vehicle countermeasure on the basis of the trouble information by the countermeasure generation unit M15.

In step S23, the vehicle control unit 14 determines whether the non-troubled vehicle countermeasure generated in step S22 is a proposal for a change of the control mode or the like. In a case where it is determined that the non-troubled vehicle countermeasure is not the proposal for the change of the control mode or the like (S23: NO), the vehicle control unit 14 does not implement the process in step S24 to the process in step S25 and the process proceeds to the process in step S26, and in a case where it is determined that the non-troubled vehicle countermeasure is the proposal for the change of the control mode or the like (S23: YES), the vehicle control unit 14 implements the process in step S24 to the process in step S25, and then the process proceeds to the process in step S26.

In step S24, the vehicle control unit 14 notifies an occupant of the non-troubled vehicle 10*y* of the proposal contents by the countermeasure implementation unit M17. At this time, in addition to the proposal contents, the vehicle control unit 14 may notify the occupant of a method of showing the occupant's intention of accepting the proposal contents.

In step S25, the vehicle control unit 14 determines whether the intention of the occupant of the non-troubled vehicle 10*y* which accepts the proposal contents has been received by the countermeasure implementation unit M17.

In a case where it is determined that the occupant's intention of accepting the proposal contents is not received (S25: NO), the vehicle control unit 14 terminates the current process. The vehicle control unit 14 may wait for a predetermined period of time until the occupant's intention is received.

In a case where the vehicle control unit 14 determines that the occupant's intention of accepting the proposal content has been received (S25: YES), the process proceeds to the process in step S26.

In step S26, the vehicle control unit 14 implements a process corresponding to the non-troubled vehicle countermeasure by the countermeasure implementation unit M17. Then, the vehicle control unit 14 terminates the current process.

Operation and Effect in This Embodiment

According to this embodiment, when vehicle travelling trouble occurs in the vehicle 10, the vehicle travelling trouble is detected, and trouble information relating to the vehicle travelling trouble is transmitted to the outside of the vehicle. In the non-troubled vehicle 10*y*, when the trouble information transmitted from the troubled vehicle 10*a* is received, a non-troubled vehicle countermeasure is generated on the basis of the trouble information, and the non-troubled vehicle countermeasure is implemented. According to this, it is possible to suppress the vehicle travelling trouble from occurring in the non-troubled vehicle 10*y*. Since the non-troubled vehicle countermeasure corresponding to the vehicle travelling trouble that occurred in the troubled vehicle 10*a* is generated, various kinds of vehicle travelling trouble can be suppressed from occurring.

In the vehicle trouble handling system 100, the plurality of vehicles 10 are connected in a communication possible manner. Accordingly, the non-troubled vehicle countermeasure can be generated on the basis of the number of the vehicle travelling trouble that occurred. As a result, an appropriate non-troubled vehicle countermeasure can be implemented in the non-troubled vehicle 10*y*.

In the vehicle trouble handling system 100, the plurality of vehicles 10 are connected in a communication possible manner by vehicle-to-vehicle communication. Accordingly, the trouble information is transmitted to the non-troubled vehicle 10*y* that is travelling around the troubled vehicle 10*a*. Here, in the non-troubled vehicle 10*y* that is travelling under the same environment as in the troubled vehicle 10*a*, there is a high possibility that the same vehicle travelling trouble as the vehicle travelling trouble that occurred in the troubled vehicle 10*a* will occur. Accordingly, according to this embodiment, it is possible to effectively suppress the vehicle travelling trouble from occurring in the non-troubled vehicle 10*y*.

In the vehicle trouble handling system 100, the occupant of the non-troubled vehicle 10*y* is notified of the trouble information. Therefore, the occupant can examine a countermeasure on the basis of the trouble information. In addition, in the vehicle trouble handling system 100, a change of a control mode or the like is proposed to the occupant of the non-troubled vehicle 10*y*. Therefore, the occupant can determine whether to accept the proposal for the change of the control mode or the like. That is, according to this embodiment, it is possible to suppress the vehicle travelling trouble from occurring in the non-troubled vehicle 10*y* while respecting the intention of the occupant of the non-troubled vehicle 10*y*.

According to this embodiment, as the non-troubled vehicle countermeasure, an instruction for a change of a control mode or the like is generated, and the instruction is implemented. According to this, it is possible to reliably suppress the vehicle travelling trouble from occurring in the non-troubled vehicle 10*y*.

In this embodiment, the vehicle control unit 14 of the troubled vehicle 10*a* that is the vehicle 10 in which the vehicle travelling trouble occurred corresponds to a first control device. In addition, the vehicle control unit 14 of the non-troubled vehicle 10*y* that receives the trouble information transmitted from the troubled vehicle 10*a* corresponds to a second control device.

Second Embodiment

Here, the entirety or a part of the functions of the vehicle display unit 12, the vehicle operation unit 13, and the vehicle control unit 14 of the first embodiment may be realized by a mobile communication device (for example, a smartphone or a tablet) carried by the occupant of the vehicle 10.

Figure 4:
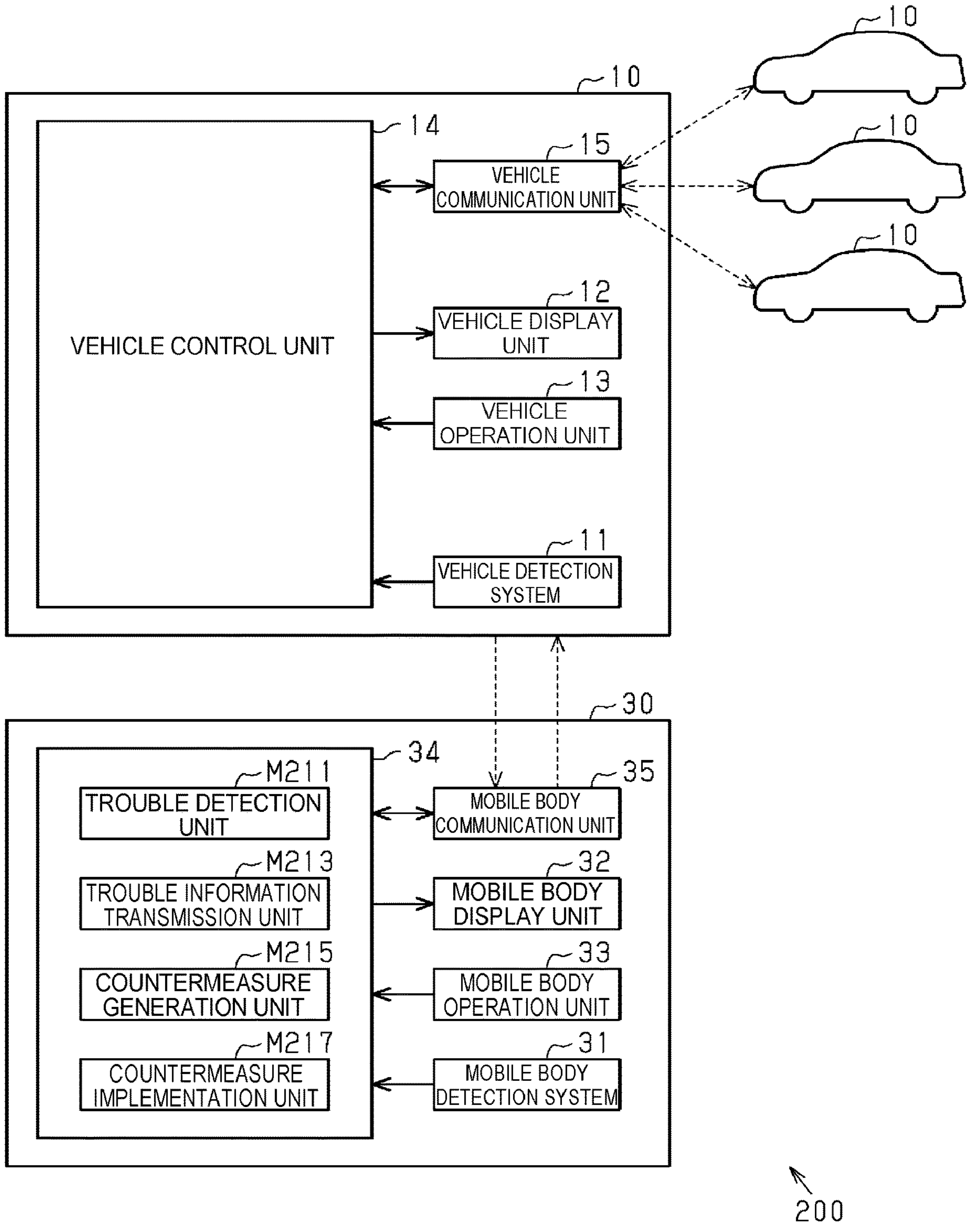
FIG. 4 is a schematic view illustrating a vehicle trouble handling system of a second embodiment.

FIG. 4 is a schematic view illustrating a second embodiment of the vehicle trouble handling system. A vehicle trouble handling system 200 of the second embodiment includes a mobile communication device 30. In this embodiment, the occupant of the vehicle 10 gets into the vehicle 10, and thus the mobile communication device 30 is disposed inside the vehicle 10. In the following description, description will be mainly given to a portion different from the first embodiment, and the same reference numeral will be given to the same or equivalent configuration as in the first embodiment, and description thereof will be omitted.

<Configuration of Mobile Communication Device>

The mobile communication device 30 includes a mobile body communication unit 35, a mobile body detection system 31, a mobile body display unit 32, a mobile body operation unit 33, and a mobile body control unit 34.

The mobile body communication unit 35 communicates with the vehicle 10, outputs information transmitted from the vehicle 10 to the mobile body control unit 34, and transmits the information output from the mobile body control unit 34 to the vehicle 10. Communication between the mobile body communication unit 35 and the vehicle 10 may be radio communication or wired communication.

The mobile body detection system 31 detects information necessary for determining whether the vehicle travelling trouble occurred in the vehicle 10, and information indicating a situation when the vehicle travelling trouble occurred. The mobile body detection system 31 includes, for example, a GPS, a magnetic sensor, an acceleration sensor, a gyroscope, and the like. The GPS detects position information. The magnetic sensor detects a direction of magnetism. The gyroscope detects a rotational speed. In the following description, an output of the mobile body detection system 31 is referred to as "mobile body sensor information".

The mobile body display unit 32 displays the information output from the mobile body control unit 34.

The mobile body operation unit 33 receives an operation by the owner of the mobile communication device 30, that is, the occupant of the vehicle 10. The mobile body operation unit 33 may include a touch panel, may include a voice recognition device, or may include an operation button.

The mobile body control unit 34 includes a CPU and a memory. A control program is stored in the memory. The mobile body control unit 34 functions as a trouble detection unit M211, a trouble information transmission unit M213, a countermeasure generation unit M215, and a countermeasure implementation unit M217 by periodically implementing the control program by the CPU. The trouble detection unit M211, the trouble information transmission unit M213, the countermeasure generation unit M215, and the countermeasure implementation unit M217 of this embodiment have functions corresponding to those of the trouble detection unit M11, the trouble information transmission unit M13, the countermeasure generation unit M15, and the countermeasure implementation unit M17 of the first embodiment.

The trouble detection unit M211 detects that the vehicle travelling trouble occurred in the vehicle 10 on the basis of the mobile body sensor information.

The trouble information transmission unit M213 transmits the trouble information from the mobile body communication unit 35 to the vehicle 10, and transmits the trouble information to the outside of the vehicle by the vehicle communication unit 15.

The countermeasure generation unit M215 acquires the trouble information transmitted from one or the plurality of troubled vehicles 10*a* through the vehicle communication unit 15 and the mobile body communication unit 35. In addition, the countermeasure generation unit M215 generates a non-troubled vehicle countermeasure on the basis of the trouble information.

The countermeasure implementation unit M217 of this embodiment implements a process corresponding to the non-troubled vehicle countermeasure. In a case where the non-troubled vehicle countermeasure is that the occupant of the non-troubled vehicle 10*y* is notified of the trouble information, or a case where the non-troubled vehicle countermeasure is a proposal for a change of a control mode or the like, the countermeasure implementation unit M217 may display the trouble information or the proposal contents on the mobile body display unit 32 or may convert the trouble information or the proposal contents into a voice.

In this embodiment, the mobile body control unit 34 of the mobile communication device 30 brought into the troubled vehicle 10*a* that is the vehicle 10 in which the vehicle travelling trouble occurred corresponds to the first control device. In addition, the mobile body control unit 34 of the mobile communication device 30 brought into the non-troubled vehicle 10*y* that receives the trouble information transmitted from the troubled vehicle 10*a* corresponds to the second control device.

Third Embodiment

Figure 5:
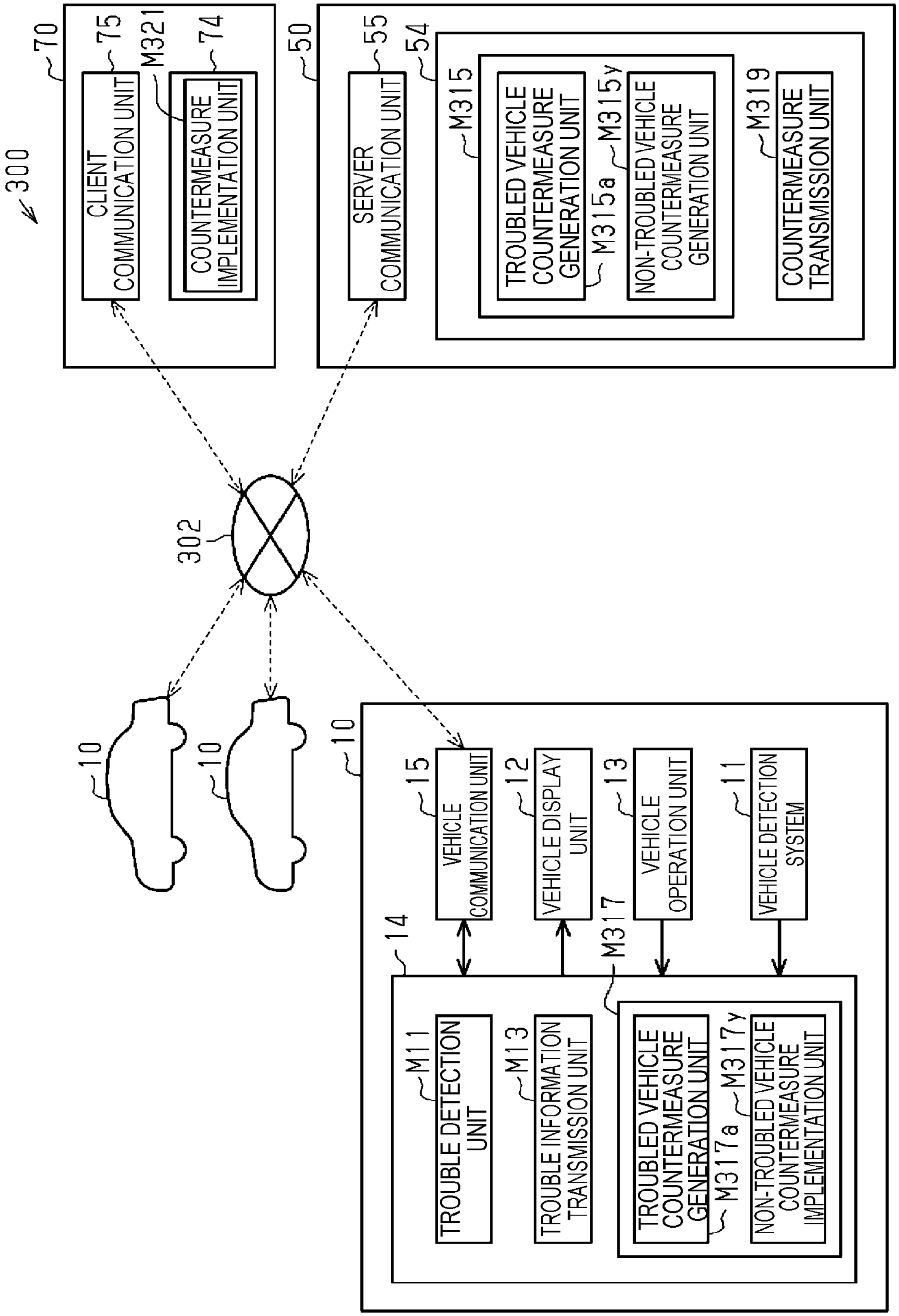
FIG. 5 is a schematic view illustrating a vehicle trouble handling system of a third embodiment.

FIG. 5 is a schematic view illustrating a third embodiment of the vehicle trouble handling system. A vehicle trouble handling system 300 of the third embodiment includes a server device 50, a client device 70, and the vehicle 10. In the following description, description will be mainly given of a portion different from the plurality of embodiments, and the same reference numeral will be given to the same or equivalent member configuration as in the plurality of embodiments, and redundant description will be omitted.

In the vehicle trouble handling system 300, the server device 50 and the client device 70 are connected to a plurality of the vehicles 10 in a communication possible manner by a mobile communication network 302. The server device 50 and the client device 70 may be connected by the mobile communication network 302, or may be connected to a fixed communication network.

In this embodiment, it is assumed that the server device 50 is installed at a facility of a company (hereinafter, referred to as a "service company") that provides a service to the occupant of each of the vehicles 10 when the vehicle travelling trouble occurred in the vehicle 10, and the client device 70 is installed at a facility of an organization (hereinafter, referred to as a "third party") that handles the vehicle travelling trouble in correspondence with information provided from the service company. As the third party, the police, road management companies, road services, stores (hereinafter, referred to as "affiliated stores") affiliated with the service companies, and the like are considered. As the affiliated stores, gas stations, vehicle repair shops, car accessory stores, and the like are considered.

<Configuration of Server Device>

The server device 50 includes a server control unit 54, and a server communication unit 55.

The server communication unit 55 outputs information received through the mobile communication network 302 to the server control unit 54, and transmits information output from the server control unit 54 through the mobile communication network 302.

The server control unit 54 includes a CPU and a memory. A control program is stored in the memory. The server control unit 54 functions as a countermeasure generation unit M315 and a countermeasure transmission unit M319 by periodically implementing the control program by the CPU.

The countermeasure generation unit M315 has a function corresponding to that of the countermeasure generation unit M15 of the first embodiment. The countermeasure generation unit M315 includes a non-troubled vehicle countermeasure generation unit M315*y* and a troubled vehicle countermeasure generation unit M315*a*.

The non-troubled vehicle countermeasure generation unit M315*y* is substantially the same as the countermeasure generation unit M15 of the first embodiment. The non-troubled vehicle countermeasure of this embodiment may be a proposal for a change of a control mode or the like or an instruction for the change of the control mode or the like as in the first embodiment. In addition, the non-troubled vehicle countermeasure of this embodiment may a proposal for a change of a speed limit in a road where the vehicle traveling trouble frequently occurs (hereinafter, referred to as a "trouble-frequent road") or a proposal for prohibition of passage on the trouble-frequent road (hereinafter, referred to as a "speed limit change or the like"), or an instruction for the change of the speed limit or the like.

On the basis of trouble information received from one or the plurality of troubled vehicles 10*a*, the troubled vehicle countermeasure generation unit M315*a* generates a countermeasure for causing the troubled vehicle 10*a* to escape from the vehicle travelling trouble, or a countermeasure for causing the troubled vehicle 10*a* or the occupant to evacuate from the vehicle travelling trouble (hereinafter, referred to as a "troubled vehicle countermeasure").

As the countermeasure for causing the troubled vehicle 10*a* to escape from the vehicle travelling trouble, making a request (hereinafter, referred to as an "escape request") for a third party to help the troubled vehicle 10*a* to escape from the vehicle travelling trouble, making a proposal for a change of a control mode or the like or the escape request to the occupant of the troubled vehicle 10*a*, or giving an instruction for the change of the control mode or the like or the escape request. The escape request includes a request for the third party to go to a position where the trouble of the troubled vehicle 10*a* occurred, and remotely getting advice about a drive method of the troubled vehicle 10*a*, or the like from the third party.

When proposing the escape request, the occupant of the troubled vehicle 10*a* may be notified of the name and contact information of the request party, and an estimate of the cost for the request contents. In a case of proposing the request for the third party to go to the trouble occurrence position, the occupant of the troubled vehicle 10*a* may be notified of an estimate of time necessary for the third party to arrive at the trouble occurrence position, and in a case of proposing remotely getting advice from the third part, the occupant may be notified of standby time until getting the advice from the third party.

As the countermeasure for causing the troubled vehicle 10*a* or the occupant to evacuate, it is considered that the occupant of the troubled vehicle 10*a* is notified of a position of a place (hereinafter, referred to as an "evacuation place") where the troubled vehicle 10*a* and the occupant evacuate, a distance up to the evacuation place, and a route up to the evacuation place. The evacuation place includes a place where the troubled vehicle 10*a* is parked and a place where the occupant of the troubled vehicle 10*a* stays. In a case where the evacuation place is the staying place of the occupant of the troubled vehicle 10*a*, the occupant may be notified of contact information of the staying place.

Here, an example of the troubled vehicle countermeasure in a case where the vehicle travelling trouble is getting stuck will be described. As the troubled vehicle countermeasure relating to the getting stuck, it is considered that an escape request relating to getting stuck or a proposal thereof is made to the road services or the affiliated stores as the third party.

Next, an example of the troubled vehicle countermeasure in a case where the vehicle travelling trouble is the fade will be described. As the troubled vehicle countermeasure relating to the fade, a proposal for a change to a control mode of suppressing utilization of a frictional braking force by promoting utilization of a braking force other than the frictional braking force, a change to a travelling route where occurrence of the braking force is suppressed, or stoppage of the troubled vehicle 10*a*, or an instruction thereof is considered. As the braking force other than the frictional braking force, a machine braking force or a regenerative braking force is considered.

The countermeasure transmission unit M319 sets a transmission target of the non-troubled vehicle countermeasure generated by the non-troubled vehicle countermeasure generation unit M315*y* or the troubled vehicle countermeasure (hereinafter, referred to as a "vehicle countermeasure"), and transmits the vehicle countermeasure to the transmission target. The countermeasure transmission unit M319 sets the transmission target on the basis of the trouble information and the vehicle countermeasure.

For example, in a case where the vehicle countermeasure is the non-troubled vehicle countermeasure, the countermeasure transmission unit M319 may set the non-troubled vehicle 10*y* that is travelling around the troubled vehicle 10*a* or the non-troubled vehicle 10*y* that is travelling on the same road as the troubled vehicle 10*a* as a transmission target of a proposal or an instruction for a change of a control mode or the like on the basis of the trouble occurrence position as the trouble information.

On the other hand, in a case where the vehicle countermeasure is the troubled vehicle countermeasure, the countermeasure transmission unit M319 may set a third party existing around the troubled vehicle 10*a* as the transmission target of the escape request on the basis of the trouble occurrence position as the trouble information.

In addition, in a case where the vehicle countermeasure is the non-troubled vehicle countermeasure, the countermeasure transmission unit M319 may set the transmission target to the non-troubled vehicle 10*y* or the third party in correspondence with contents of the non-troubled vehicle countermeasure. In this case, the countermeasure transmission unit M319 sets the transmission target to the non-troubled vehicle 10*y* in a case where the non-troubled vehicle countermeasure is the proposal for the change of the control mode or the like or the instruction for the change of the control mode or the like, and sets the transmission target to the police or the road management company as the third party in a case where the non-troubled vehicle countermeasure is the proposal for the change of the speed limit or the like in the trouble-frequent road, or the instruction for the change of the speed limit or the like in the trouble-frequent road.

On the other hand, in a case where the vehicle countermeasure is the troubled vehicle countermeasure, the countermeasure transmission unit M319 may set the transmission target to the troubled vehicle 10*a* or the third party in correspondence with the contents of the troubled vehicle countermeasure. In this case, the countermeasure transmission unit M319 may set the transmission target to the troubled vehicle 10*a* in a case where the troubled vehicle countermeasure is the proposal for the change of the control mode or the like or the escape request, or the instruction for the change of the control mode or the like, and sets the transmission target to the road service or the affiliated stores as the third party in a case where the troubled vehicle countermeasure is making of the escape request.

<Configuration of Client Device>

The client device 70 includes a client control unit 74 and a client communication unit 75.

The client communication unit 75 outputs information received through the mobile communication network 302 to the client control unit 74, and transmits information output from the client control unit 74 through the mobile communication network 302.

The client control unit 74 includes a CPU and a memory. A control program is stored in the memory. The client control unit 74 functions as a countermeasure implementation unit M321 by periodically implementing the control program by the CPU.

The countermeasure implementation unit M321 implements a process corresponding to the vehicle countermeasure transmitted from the server device 50.

For example, in a case where the vehicle countermeasure is a non-troubled vehicle countermeasure that proposes the change of the speed limit or the like in the trouble-frequent road to the police or the road management company as the third party, the countermeasure implementation unit M321 notifies the police or the road management company of the proposal contents. In a case where the vehicle countermeasure is the troubled vehicle countermeasure that gives an instruction for a road service company, a gas station, or a vehicle repair shop as the third party to take a measure for the escape request, the countermeasure implementation unit M321 makes a request for the load service company, the gas station, or the vehicle repair shop to cause the troubled vehicle 10*a* to escape from the vehicle travelling trouble.

<Configuration of Vehicle>

A countermeasure implementation unit M317 of this embodiment takes a measure corresponding to the vehicle countermeasure transmitted from the server device 50. The countermeasure implementation unit M317 includes a non-troubled vehicle countermeasure implementation unit M317*y* and a troubled vehicle countermeasure implementation unit M317*a*.

The non-troubled vehicle countermeasure implementation unit M317*y* has a function corresponding to that of the countermeasure implementation unit M17 of the first embodiment, and the non-troubled vehicle countermeasure implementation unit M317*y* implements a process corresponding to the non-troubled vehicle countermeasure transmitted from the server device 50.

The troubled vehicle countermeasure implementation unit M317*a* implements a process corresponding to the troubled vehicle countermeasure transmitted from the server device 50. For example, in a case where the troubled vehicle countermeasure is the proposal for the change of the control mode or the like or the escape request, the troubled vehicle countermeasure implementation unit M317*a* notifies the occupant of the troubled vehicle 10*a* of the proposal contents of the change of the control mode or the like or the escape request. In addition, in a case where the troubled vehicle countermeasure is the instruction for the change of the control mode or the like, the troubled vehicle countermeasure implementation unit M317*a* implements the change of the control mode or the like.

The configuration of the vehicle 10 of this embodiment is substantially the same as in the first embodiment except for the above-described functions.

<Flow of Process of Handling Vehicle Travelling Trouble>

(1) Flow of Trouble Information Transmission Process

A trouble information transmission process of this embodiment is substantially the same as the trouble information transmission process in the first embodiment illustrated in FIG. 2. Accordingly, description of the process will be omitted. However, a transmission target of the trouble information trouble information transmission unit M13 is the server device 50.

In this embodiment, the vehicle control unit 14 of the troubled vehicle 10*a* that is the vehicle 10 in which the vehicle travelling trouble occurred corresponds to the first control device. In addition, the server control unit 54 of the server device 50 which receives the trouble information transmitted from the troubled vehicle 10*a* corresponds to the second control device.

Figure 6:
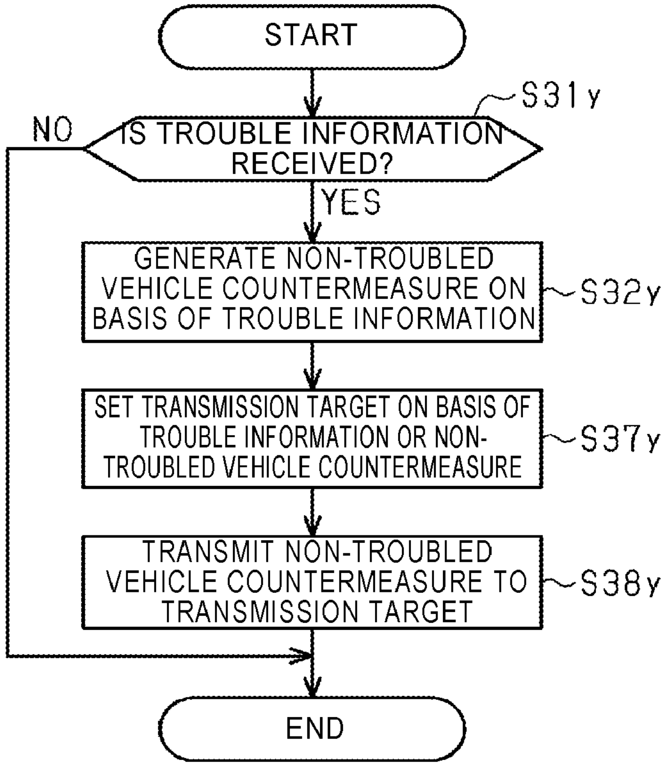
FIG. 6 is a flowchart illustrating a flow of a process of generating a non-troubled vehicle countermeasure and transmitting the countermeasure in a server device.

(2) Flow of Process of Generating Countermeasure for Vehicle Travelling Trouble in Server Device FIG. 6 is a flowchart illustrating a flow of a process of receiving trouble information transmitted from the troubled vehicle 10*a*, generating the non-troubled vehicle countermeasure on the basis of the trouble information, and transmitting the non-troubled vehicle countermeasure to the non-troubled vehicle 10*y* or the third party (hereinafter, referred to as a "non-troubled vehicle countermeasure transmission process") in the server device 50. A program corresponding to this process is stored in the memory of the server control unit 54, and is implemented by the CPU of the server control unit 54.

Processes in step S31*y* and step S32*y* of FIG. 6 are substantially the same as the processes of the first embodiment as shown in step S21 and step S22 of FIG. 3.

When it is determined that the trouble information transmitted from the troubled vehicle 10*a* has been received in step S31*y*, the server control unit 54 generates a non-troubled vehicle countermeasure on the basis of the trouble information by the non-troubled vehicle countermeasure generation unit M315*y* in step S32*y*.

The server control unit 54 sets a transmission target on the basis of the trouble information and the non-troubled vehicle countermeasure by the countermeasure transmission unit M319 in step S37*y*, and transmits the non-troubled vehicle countermeasure to the transmission target in step S38*y*.

Figure 7:
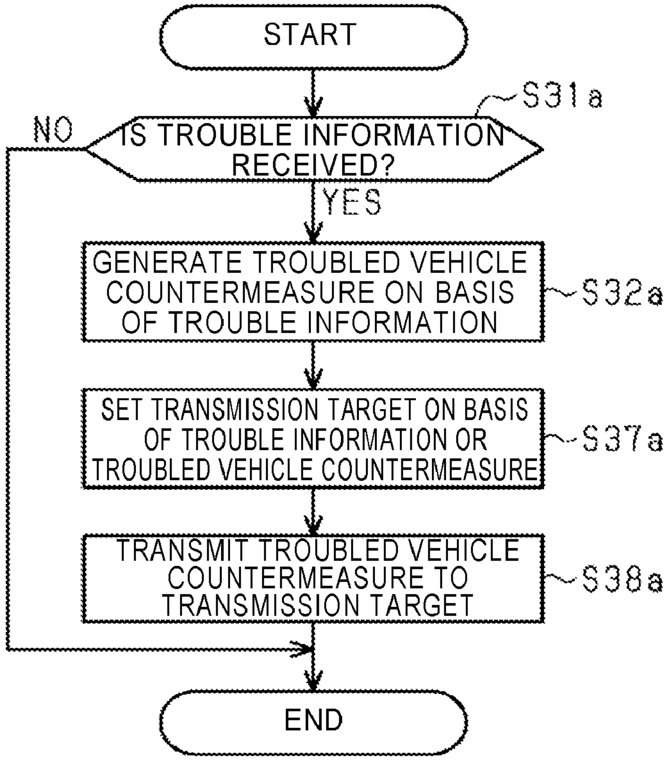
FIG. 7 is a flowchart illustrating a flow of a process of generating a troubled vehicle countermeasure and transmitting the countermeasure in the server device.

FIG. 7 is a flowchart illustrating a flow of a process of receiving the trouble information transmitted from the troubled vehicle 10*a*, generating a troubled vehicle countermeasure on the basis of the trouble information, and transmitting the troubled vehicle countermeasure to the troubled vehicle 10*a* or the third party (hereinafter, referred to as a "troubled vehicle countermeasure transmission process") in the server device 50. A program corresponding to this process is stored in the memory of the server control unit 54, and is implemented by the CPU of the server control unit 54.

A process in step S31*a* of FIG. 7 is substantially the same as the process of the first embodiment as shown in step S21 of FIG. 3.

When it is determined that the trouble information transmitted from the troubled vehicle 10*a* has been received in step S31*a*, the server control unit 54 implements a process from step S32*a* to step S38*a*.

In step S32*a*, the server control unit 54 generates the troubled vehicle countermeasure by the troubled vehicle countermeasure generation unit M315*a* on the basis of the trouble information.

The server control unit 54 sets the transmission target on the basis of the trouble information and the troubled vehicle countermeasure by the countermeasure transmission unit M319 in step S37*a*, and transmits the troubled vehicle countermeasure to the transmission target in step S38*a*.

Figure 8:
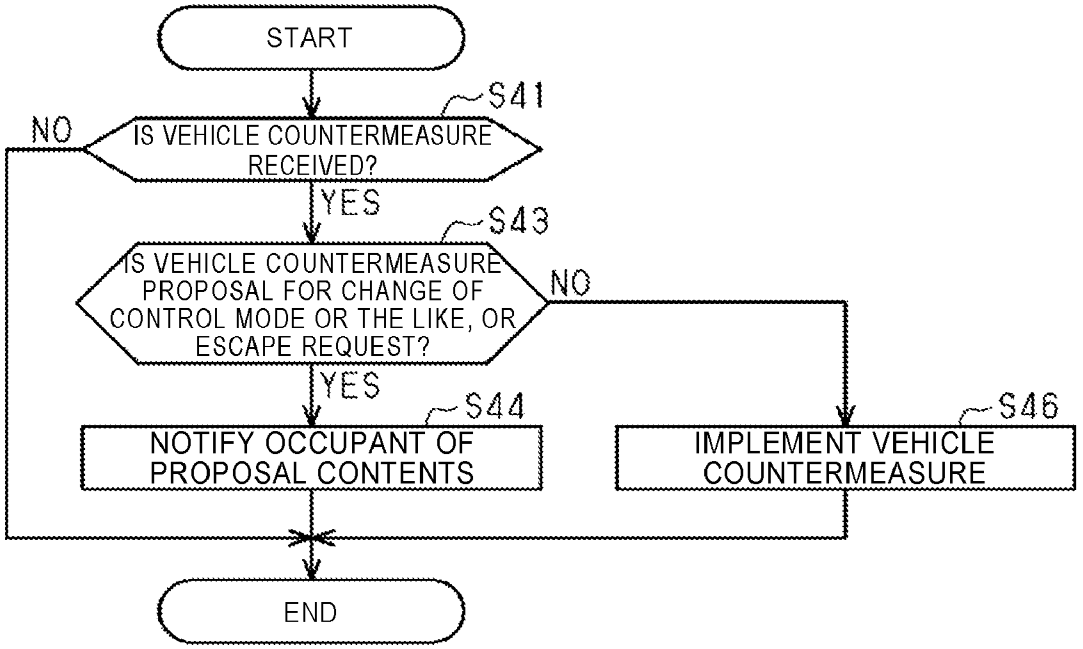
FIG. 8 is a flowchart illustrating a flow of a process of receiving the non-troubled vehicle countermeasure and the troubled vehicle countermeasure and implementing the countermeasures in a client device.

(3) Flow of Process of Implementing Countermeasure for Vehicle Travelling Trouble in Client Device FIG. 8 is a process of receiving a vehicle countermeasure transmitted from the server device 50 and implementing a process corresponding to the vehicle countermeasure in the client device 70. A program corresponding to the process is stored in the memory of the client control unit 74, and is periodically implemented by the CPU of the client control unit 74.

In step S41, the client control unit 74 determines whether the vehicle countermeasure transmitted from the server device 50 has been received. In a case where it is determined that the vehicle countermeasure is not received (S41: NO), the client control unit 74 terminates the current process. In a case where the client control unit 74 determines that the vehicle countermeasure has been received (S41: YES), the process proceeds to a process in step S43.

Processes in steps S43, S44, and S46 in FIG. 8 correspond to the processes in steps S23, S24, and S26 in FIG. 3.

In step S43, the client control unit 74 determines whether the vehicle countermeasure is a proposal for a change of a control mode or the like or an escape request. In a case where the client control unit 74 determines that the vehicle countermeasure is the proposal for the change of the control mode or the like or the escape request (S43: YES), the process proceeds to the process in step S44, and in a case where the client control unit 74 determines that the vehicle countermeasure is not the proposal for the change of the control mode or the like or the escape request (S43: NO), the process proceeds to the process in step S46.

In step S44, the client control unit 74 notifies an occupant of the vehicle 10 of proposal contents by the countermeasure implementation unit M317.

In step S46, the client control unit 74 implements a process corresponding to the vehicle countermeasure by the countermeasure implementation unit M317.

Here, the proposal contents of which the occupant of the vehicle 10 is notified in step S44 may be contents including a request for the third party. For example, in a case where the vehicle 10 (troubled vehicle 10*a*) gets stuck, a proposal for making a request for the third party to help the vehicle 10 to escape from getting-struck is made for the occupant of the vehicle 10 from the client device 70. In this case, whether the occupant intends to accept the proposal contents is transmitted from the vehicle 10 to the client device 70.

Figure 9:
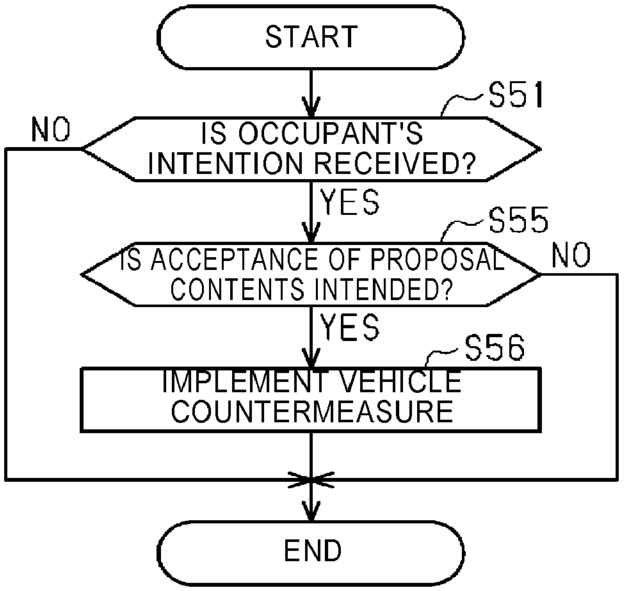
FIG. 9 is a flowchart illustrating a flow of a process of implementing a vehicle countermeasure in correspondence with an intention of a vehicle occupant in the client device.

FIG. 9 is a process of receiving the occupant's intention for the proposal contents after notifying the occupant of the vehicle 10 of the proposal contents in step S44, and implementing a process corresponding to the intention in the client device 70. A program corresponding to the process is stored in the memory of the client control unit 74, and is periodically implemented by the CPU of the client control unit 74.

In step S51, the client control unit 74 determines whether the occupant's intention has been received from the vehicle 10 notified of the proposal content in step S44. The occupant's intention stated here represents whether the occupant accepts the proposal contents proposed in the notification by the client device 70.

In step S55, in a case where the client control unit 74 determines that the occupant of the vehicle 10 has the intention of accepting the proposal contents (S55: YES), the process proceeds to a process in step S56. In a case where it is determined that the occupant of the vehicle 10 does not have the intention of accepting the proposal content (S55: NO), the client control unit 74 terminates the current process.

In step S56, the client control unit 74 implements a process corresponding to the vehicle countermeasure by the countermeasure implementation unit M317.

(4) Flow of Process of Implementing Countermeasure for Vehicle Travelling Trouble in Vehicle A process of receiving a non-troubled vehicle countermeasure transmitted from the server device 50 and implementing the non-troubled vehicle countermeasure (hereinafter, referred to as a "non-troubled vehicle countermeasure implementation process") in the non-troubled vehicle 10*y* corresponds to the vehicle countermeasure implementation process in the first embodiment. A control program corresponding to the process is stored in the memory of the vehicle control unit 14, and is periodically implemented by the CPU of the vehicle control unit 14.

The vehicle control unit 14 of the non-troubled vehicle 10*y* determines whether the non-troubled vehicle countermeasure has been received from the server device 50, and in a case where it is determined that the non-troubled vehicle countermeasure has been received, the vehicle control unit 14 implements substantially the same process as the process from step S23 to step S26 of the first embodiment shown in FIG. 3.

A process of receiving the troubled vehicle countermeasure transmitted from the server device 50, and implementing the troubled vehicle countermeasure (hereinafter, referred to as a "troubled vehicle countermeasure implementation process") in the troubled vehicle 10*a* is different from the non-troubled vehicle countermeasure implementation process in that a target of the non-troubled vehicle countermeasure implementation process is the non-troubled vehicle 10*y*. However, a flow of the troubled vehicle countermeasure implementation process is substantially the same as the flow of the non-troubled vehicle countermeasure implementation process.

The vehicle control unit 14 of the troubled vehicle 10*a* determines whether the troubled vehicle countermeasure has been received from the server device 50. In a case where it is determined that the troubled vehicle countermeasure is not received, the vehicle control unit 14 terminates the current process, and in a case where it is determined that the troubled vehicle countermeasure has been received, the vehicle control unit 14 determines whether the troubled vehicle countermeasure is a proposal for a change of a control mode or the like or an escape request.

In a case where it is determined that the troubled vehicle countermeasure is the proposal for the change of the control mode or the like or the escape request, the vehicle control unit 14 notifies an occupant of the troubled vehicle 10*a* of the proposal contents by the troubled vehicle countermeasure implementation unit M317*a*. In addition, in a case where an occupant's intention of accepting the proposal contents has been received, the vehicle control unit 14 implements a process corresponding to the troubled vehicle troubled countermeasure by the vehicle countermeasure implementation unit M317*a*.

In a case where it is determined that the troubled vehicle countermeasure is not the proposal for the change of the control mode or the like or the escape request, the vehicle control unit 14 implements a process corresponding to the troubled vehicle countermeasure by the troubled vehicle countermeasure implementation unit M317*a*.

Operation and Effect in This Embodiment

According to this embodiment, in the vehicle 10, when vehicle travelling trouble occurs, the vehicle travelling trouble is detected, and trouble information relating to the vehicle travelling trouble is transmitted to the server device 50. In the server device 50, when the trouble information transmitted from the troubled vehicle 10*a* is received, a vehicle countermeasure is generated on the basis of the trouble information, and the vehicle countermeasure is transmitted to the client device 70 or the vehicle 10. In the client device 70 or the vehicle 10, when the vehicle countermeasure is received, a process corresponding to the vehicle countermeasure is implemented.

In this manner, since the non-troubled vehicle countermeasure is implemented for the non-troubled vehicle 10*y*, this embodiment has a similar effect as in the first embodiment with respect to the non-troubled vehicle 10*y*.

In addition, since the troubled vehicle countermeasure is implemented with respect to the troubled vehicle 10*a*, according to this embodiment, it is possible to cause the troubled vehicle 10*a* to escape from the vehicle travelling trouble or it is possible to cause the troubled vehicle 10*a* or the occupant thereof to evacuate from the vehicle travelling trouble.

In the vehicle trouble handling system 300, the vehicle 10 and the server device 50 are connected to each other by the mobile communication network 302 in a communication possible manner. Therefore, according to this embodiment, trouble information can be received from the plurality of the vehicles 10 existing in a wide range of region as compared with vehicle-to-vehicle communication. In addition, since a plurality of pieces of the trouble information are integrated in the server device 50 to generate a vehicle countermeasure, a vehicle countermeasure with a high added value can be generated.

Modification Example

The plurality of embodiments can be modified and implemented as follows. The plurality of embodiments and the following modification example can be implemented in combination with each other within a technically consistent range.

- In the second embodiment, it has been assumed that functions of the trouble detection unit M11, the countermeasure generation unit M15, and the countermeasure implementation unit M17 are realized by the mobile communication device 30. However, parts of the functions may be realized by the mobile communication device 30 and the vehicle 10, or may be realized by the vehicle 10 instead of the mobile communication device 30.

For example, the trouble detection unit M11 may detect that the vehicle travelling trouble occurred on the basis of the vehicle sensor information in addition to the mobile body sensor information, or may detect that the vehicle travelling trouble occurred on the basis of the vehicle sensor information instead of the mobile body sensor information.

- The countermeasure implementation unit M17 may display the proposal contents of the change of the control mode or the like on the vehicle display unit 12 in addition to the mobile body display unit 32, or on the vehicle display unit 12 instead of the mobile body display unit 32. In addition, among functions of the countermeasure implementation unit M17, a function relating to the proposal for the change of the control mode or the like may be realized by the mobile body control unit 34, and a function relating to the instruction for the change of the control mode or the like may be realized by the vehicle control unit 14.
- In the third embodiment, it has been assumed that the vehicle trouble handling system 300 includes the server device 50, the client device 70, and the vehicle 10.

However, the vehicle trouble handling system may not include the client device 70.

In the third embodiment, it has been assumed that the countermeasure generation unit M315 of the server device 50 includes the non-troubled vehicle countermeasure generation unit M315*y* and the troubled vehicle countermeasure generation unit M315*a*. However, the countermeasure generation unit M315 may include either the non-troubled vehicle countermeasure generation unit M315*y* or the troubled vehicle countermeasure generation unit M315*a*.

In the third embodiment, it has been assumed that the countermeasure implementation unit M317 of the vehicle 10 includes the non-troubled vehicle countermeasure implementation unit M317*y* and the troubled vehicle countermeasure implementation unit M317*a*. However, the countermeasure implementation unit M317 may include either the non-troubled vehicle countermeasure implementation unit M317*y* or the troubled vehicle countermeasure implementation unit M317*a*.

In the third embodiment, in the vehicle trouble handling system 300, it has been assumed that the vehicle 10 and the server device 50 are connected in a communication possible manner. However, in the vehicle trouble handling system, a mobile communication device instead of the vehicle 10, and the server device 50 may be connected in a communication possible manner.

In this case, when the occupant of the vehicle 10 gets on the vehicle 10, the mobile communication device is disposed inside the vehicle 10. In addition, the functions of the trouble detection unit M11, the trouble information transmission unit M13, and the countermeasure implementation unit M317 of the third embodiment are realized by the mobile communication device. In the mobile communication device, configurations corresponding to the vehicle display unit 12, the vehicle operation unit 13, the vehicle control unit 14, and the vehicle communication unit 15 of the third embodiment are substantially the same as the configurations of the mobile body display unit 32, the mobile body operation unit 33, the mobile body control unit 34, the mobile body control unit 34, and the mobile body communication unit 35 described in the second embodiment.

In the third embodiment, it has been assumed that the client device 70 is installed at the police, the road management company, the road service, or the affiliated stores. However, the client device 70 may be a mobile communication device such as a mobile phone and a tablet. In this case, the client device 70 can be carried by the police, the road management company, the road service, or a staff, a manager, and an employee of the affiliated stores. Therefore, it is possible to quickly handle the vehicle travelling trouble.

In the third embodiment, it has been assumed that the countermeasure implementation unit M321 of the client device 70 notifies the occupant of the vehicle 10 of the proposal for the change of the control mode or the like or the escape request, receives the intention of the occupant, and determines whether presence or absence of the intention of accepting the proposal. However, the countermeasure implementation unit M321 may give an instruction for the vehicle 10 to implement the above-described process.

In the third embodiment, the function of the countermeasure implementation unit M317 has been described by exemplifying, as the vehicle countermeasure, the non-troubled vehicle countermeasure such as the proposal for the change of the speed limit or the like in the trouble-frequent road to the police or the road management company as the third party. However, the non-troubled vehicle countermeasure may be giving an instruction for the police or the road management company to change the speed limit or the like in the trouble-frequent road. In this case, it is considered that the countermeasure implementation unit M317 changes the speed limit in the trouble-frequent road or displays prohibition of passage on the trouble-frequent road by a variable sign or an electronic bulletin board on the road.

The vehicle control unit 14, the mobile body control unit 34, or the server control unit 54 includes the CPU and the ROM, and implements software processing, but there is no limitation thereto. For example, a dedicated hardware circuit may be provided to perform hardware processing on at least a part processed by software in the respective embodiments.

Technical Idea Capable of Being Grasped from Embodiments Etc.

Next, a technical idea capable of being grasped from the plurality of embodiments and the modification example will be described.

(A) A vehicle system in which the first control device is a mobile communication device. In this case, when an occupant gets on a vehicle, the first control device is disposed inside the vehicle.

(B) A vehicle system in which a second control device is disposed in a vehicle different from the vehicle in which the first control device is disposed. Hereinafter, the vehicle in which the first control device is disposed is referred to as a first vehicle, and the vehicle different from the first vehicle is referred to as a second vehicle.

(C) A vehicle system in which the second control device disposed in the second vehicle includes a countermeasure implementation unit that implements a countermeasure generated by a countermeasure generation unit.

(D) A vehicle system in which the countermeasure implementation unit of the second control device disposed in the second vehicle notifies an occupant of the second vehicle of information relating to the countermeasure generated by the countermeasure generation unit.

(E) A vehicle system in which the second control device is installed at a facility of an organization that provides a service to an occupant of a vehicle when vehicle travelling trouble occurred in the vehicle.

(F) A vehicle system in which a trouble information transmission unit of the first control device transmits trouble information to the second control device by vehicle-to-vehicle communication.

(G) A vehicle system in which the trouble information transmission unit of the first control device transmits the trouble information to the second control device by a mobile communication network.

(H) A vehicle system in which the second control device is installed at a facility that provides a service to an occupant of a vehicle when vehicle travelling trouble occurred in the vehicle in which the first control device is disposed.

(I) A vehicle system in which the second control device includes a countermeasure transmission unit that transmits the countermeasure generated by the countermeasure generation unit to the first control device.

(J) A vehicle system in which the first control device includes a countermeasure implementation unit that implements the countermeasure transmitted from the second control device.

(K) A vehicle system in which the second control device includes a countermeasure transmission unit that transmits the countermeasure generated by the countermeasure generation unit to a third control device different from the first control device and the second control device.

(L) A vehicle system in which the third control device is disposed in a vehicle different from the vehicle in which the first control device is disposed.

(M) A vehicle system in which the third control device is installed at a facility of an organization that handles the vehicle travelling trouble.

(N) A vehicle system in which the third control device is a mobile communication device.

(O) A vehicle system in which the countermeasure transmission unit of the second control device sets a countermeasure transmission target on the basis of at least one of the trouble information transmitted from the first control device and the countermeasure generated by the countermeasure generation unit.

(P) A control device that constitutes the vehicle system, including: a trouble detection unit that detects that trouble relating to vehicle's travelling; and a trouble information transmission unit that transmits trouble information relating to the trouble detected by the trouble detection unit to the outside of the vehicle.

(Q) A control device that constitutes the vehicle system, including: a trouble information reception unit that receives trouble information from the outside of a vehicle; and a countermeasure generation unit that generates a countermeasure corresponding to the trouble information received by the trouble information reception unit.

(R) A control device including a transmission unit that transmits the countermeasure generated by the countermeasure generation unit.

The invention claimed is:

1. A vehicle trouble handling system, comprising:

a first control device that is disposed in a vehicle: and a second control device that is disposed outside the vehicle, and handles trouble relating to travelling of the vehicle, wherein the first control device includes:

a trouble detection unit that detects occurrence of the trouble in the vehicle; and a trouble information transmission unit that transmits trouble information relating to the trouble detected by the trouble detection unit to the second control device, the second control device includes:

a countermeasure generation unit that generates a countermeasure corresponding to the trouble information transmitted from the trouble information transmission unit, and the countermeasure generation unit generates, as the countermeasure, a non-troubled vehicle countermeasure for suppressing occurrence of the trouble in a non-troubled vehicle in which the trouble does not occur, and the countermeasure generation unit generates at least one countermeasure among a proposal for a change of a control mode in the non-troubled vehicle, an instruction for a change of the control mode in the non-troubled vehicle, a proposal for a change of a travelling route of the non-troubled vehicle, and an instruction for a change of the travelling route of the non-troubled vehicle as the non-troubled vehicle countermeasure.

2. The vehicle trouble handling system according to claim 1, wherein the countermeasure generation unit generates a troubled vehicle countermeasure including at least one of a countermeasure for causing a troubled vehicle in which trouble occurred to escape from the trouble, and a countermeasure for causing the troubled vehicle to evacuate from the trouble as the countermeasure, and the second control device includes a countermeasure transmission unit that transmits the troubled vehicle countermeasure generated by the countermeasure generation unit to the troubled vehicle.

3. A vehicle trouble handling system, comprising:

a first control device that is disposed in a vehicle; and a second control device that is disposed outside the vehicle, and handles trouble relating to travelling of the vehicle, wherein the first control device includes:

a trouble detection unit that detects occurrence of the trouble in the vehicle; and a trouble information transmission unit that transmits trouble information relating to the trouble detected by the trouble detection unit to the second control device, the second control device includes:

a countermeasure generation unit that generates a countermeasure corresponding to the trouble information transmitted from the trouble information transmission unit, and the countermeasure generation unit generates, as the countermeasure, a non-troubled vehicle countermeasure for suppressing occurrence of the trouble in a non-troubled vehicle in which the trouble does not occur, the trouble includes at least one of a trouble that interferes with traveling of the vehicle and a trouble in which traveling of the vehicle becomes impossible, the countermeasure generation unit generates a troubled vehicle countermeasure including at least one of a countermeasure for causing a troubled vehicle in which trouble occurred to escape from the trouble, and a countermeasure for causing the troubled vehicle to evacuate from the trouble as the countermeasure, and the second control device includes a countermeasure transmission unit that transmits the troubled vehicle countermeasure generated by the countermeasure generation unit to the troubled vehicle.

4. The vehicle trouble handling system according to claim 3, wherein the countermeasure generation unit generates at least one countermeasure among a proposal for a change of a control mode in the troubled vehicle, an instruction for a change of the control mode in the troubled vehicle, a proposal for a change of a travelling route of the troubled vehicle, and an instruction for a change of the travelling route of the troubled vehicle as the troubled vehicle countermeasure.

5. The vehicle trouble handling system according to claim 3, wherein the countermeasure generation unit generates at least one countermeasure among a proposal for a change of a control mode in the non-troubled vehicle and an instruction for a change of the control mode in the non-troubled vehicle.

* * * * *